Nov. 15, 1966 G. L. CLAPPER 3,286,103

MULTISTABLE CIRCUIT

Filed Dec. 30, 1963 4 Sheets-Sheet 1

INVENTOR.
GENUNG L. CLAPPER
BY [signature]
ATTORNEY

INVENTOR.
GENUNG L. CLAPPER
BY [signature]
ATTORNEY

Nov. 15, 1966 G. L. CLAPPER 3,286,103

MULTISTABLE CIRCUIT

Filed Dec. 30, 1963 4 Sheets-Sheet 3

INVENTOR.
GENUNG L. CLAPPER
BY [signature]
ATTORNEY

Nov. 15, 1966 G. L. CLAPPER 3,286,103

MULTISTABLE CIRCUIT

Filed Dec. 30, 1963 4 Sheets-Sheet 4

INVENTOR.
GENUNG L. CLAPPER

BY [signature]

ATTORNEY

United States Patent Office 3,286,103

Patented Nov. 15, 1966

3,286,103

MULTISTABLE CIRCUIT

Genung L. Clapper, Vestal, N.Y., assignor to International Business Machines Corporation, New York, N.Y., a corporation of New York Filed Dec. 30, 1963, Ser. No. 334,397

12 Claims. (Cl. 307—88.5)

This invention relates to electrical circuits and, more particularly, to circuits which are stable in more than two distinct states of operation.

Bistable circuits having two stable states of operation have found wide use in computer applications. To provide greater adaptability, however, such circuits are often modified to render them multistable, i.e., having more than two stable operating states. Known multistable circuits typically involve what is termed a "stepped impedance" characteristic, achieved by selectively switching different load resistors into a circuit to provide the different stable operating states. A disadvantage of the stepped impedance technique is that a reliable circuit is difficult to construct that is not sensitive to variations in circuit parameters brought about by temperature changes, component aging and the like.

The present invention is directed toward a reliable multistable circuit, achieved by employing selective decoupling of regeneratively coupled electrical translating devices forming a typical bistable circuit, as well as selective degenerative feedback in each of the devices. The selective decoupling of the regenerative coupling provides a single additional stable state typically characterized by equal conduction in the translating devices. The selective degenerative feedback in each device counteracts the regenerative coupling and provides any number of additional stable states.

In a practical embodiment of the invention, two transistors are employed as the translating devices of a bistable circuit. A resistor in each emitter circuit is coupled through an associated diode directly to the emitter of the other transistor. The diodes serve to provide regenerative coupling between the transistor emitters, so that when one of the transistors conducts heavily, the other transistor is driven to a state of nonconduction, thereby providing the bistable operating states of the circuit. The diodes, however, isolate the emitters of the transistors from each other when the transistors are conducting substantially equally, to produce a stable intermediate state. Until an input signal is applied to the circuit to disturb the balance and to reinstate the regenerative coupling, this stable intermediate state persists.

Each transistor collector is coupled to its associated base by one or more diode pairs, each pair being rendered conductive at a different collector potential. At each of these potentials, then, the collector and the base of the associated transistor are coupled together, which provides degenerative feedback in the transistor that resists further changes in conduction. Each diode pair thus provides a stable state of conduction which counteracts the regenerative coupling of the transistors through the cross-coupled emitters and which is in addition to the stable intermediate state described above.

Decoupling of regeneratively coupled translating devices in a bistable circuit may be employed by itself to provide a single additional stable state of operation. By the same token, degenerative feedback in each device may be employed by itself to provide any number of additional stable operating states.

The invention also contemplates the provision of capacitive coupling between elements of the translating devices to store for a limited time the input signals applied to the circuit. In this fashion, input signals insufficient to switch the circuit from one state to another may be accumulated through storage so that a combination of such signals is sufficient to switch the circuit. This type of operation finds use in computer applications wherein it is necessary to provide memory, i.e., the ability of a circuit to react in response to previous signals applied thereto. Two input terminals provide entry points for input signals to selectively move the multistable circuit through a sequence of conduction states starting from any given state and reversing the direction as often as required.

A detailed description of the invention follows, which is to be read in conjunction with the accompanying drawings, in which.

Figure 2:
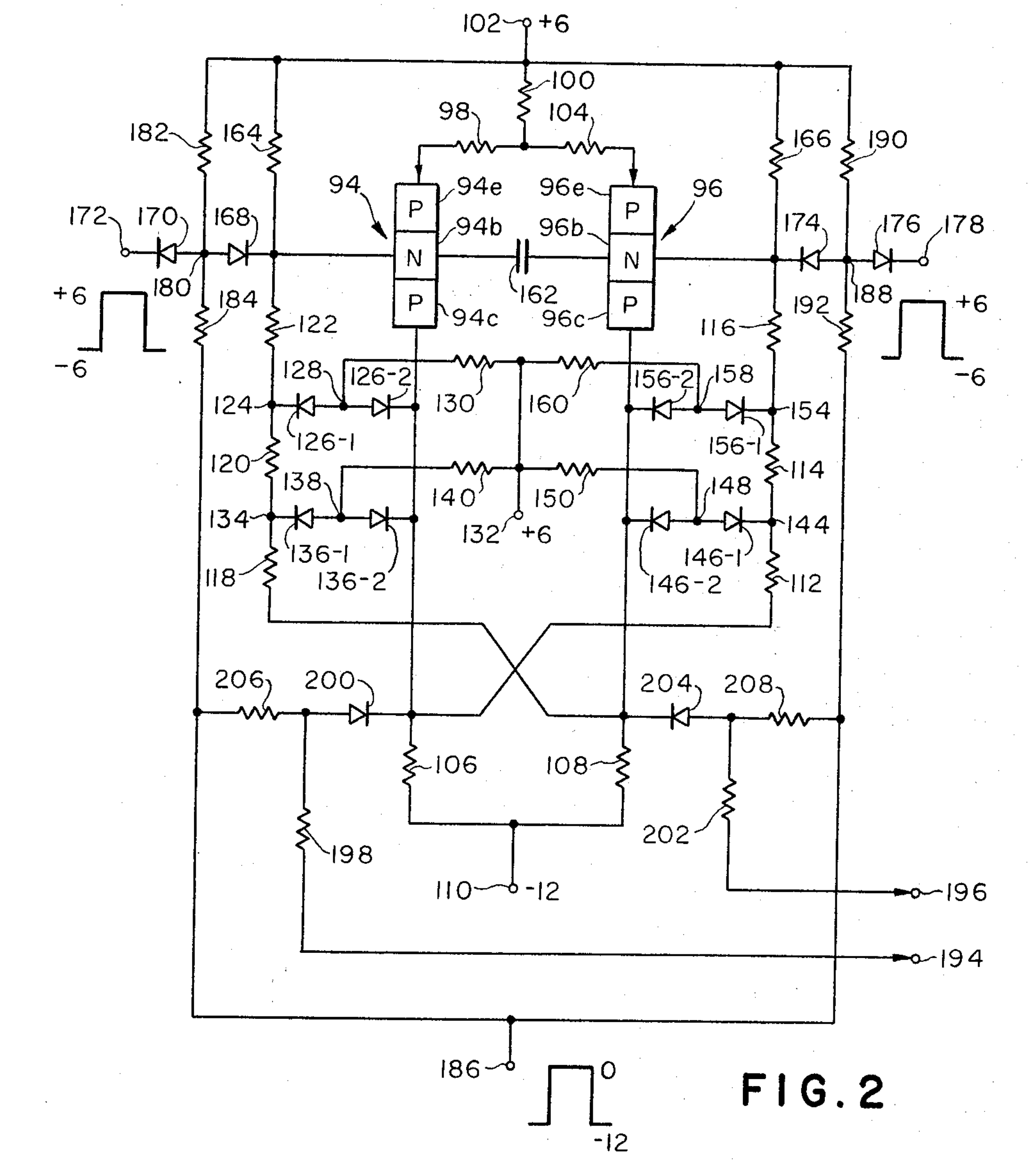
FIG. 2 is a detailed diagram of a multistable circuit in accordance with the invention employing selective degenerative feedback in regeneratively coupled translating devices.
Figure 2A:
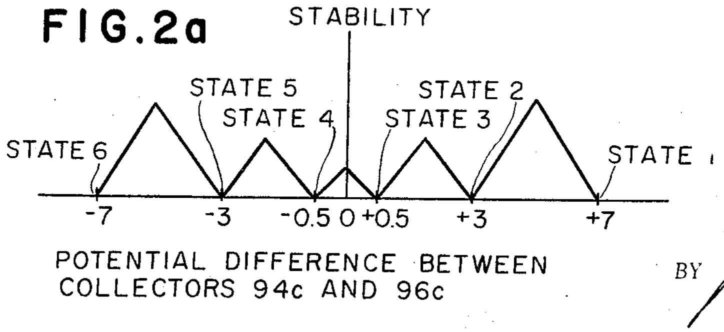
Figure 3:
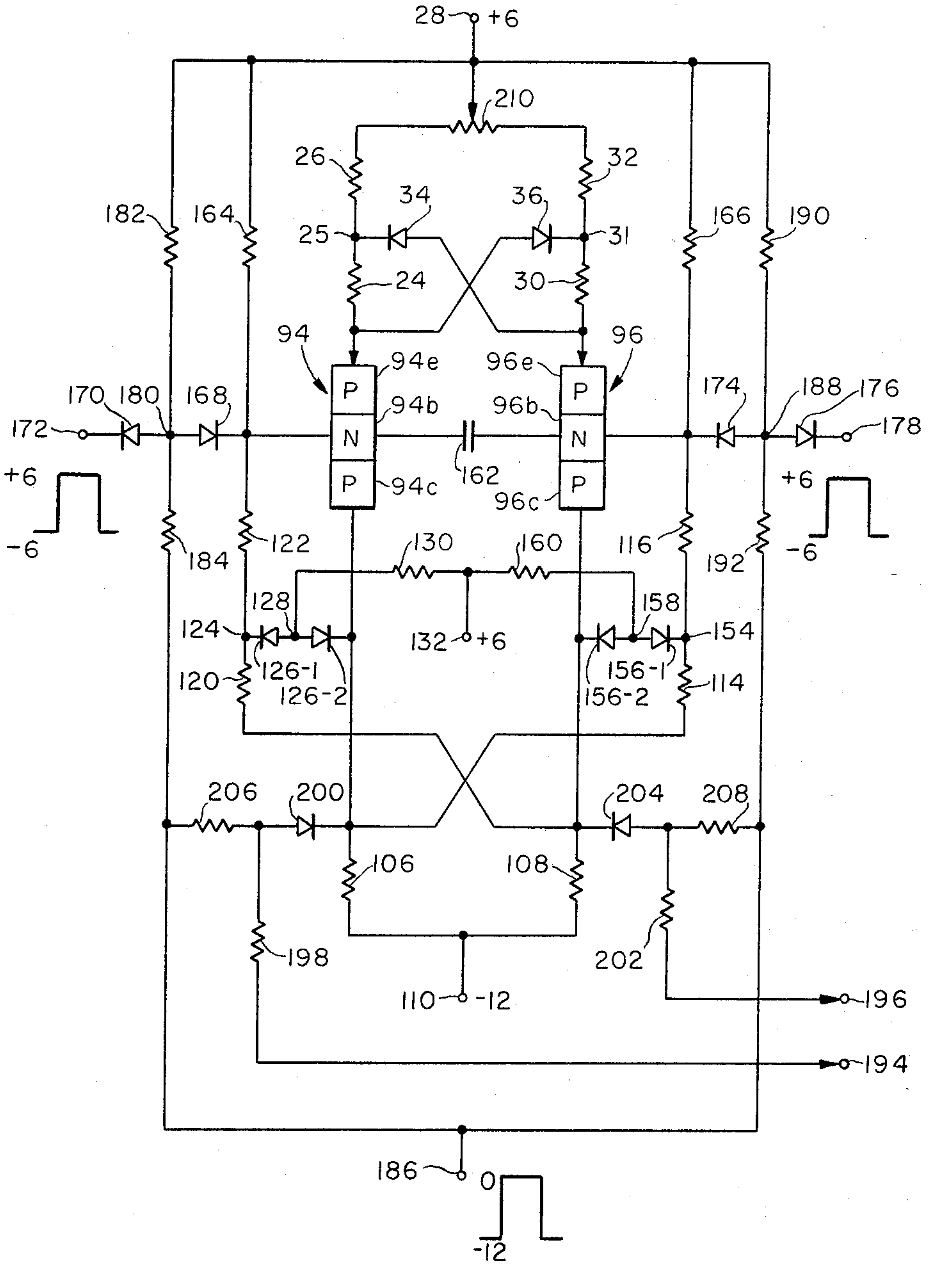
Figure 4:
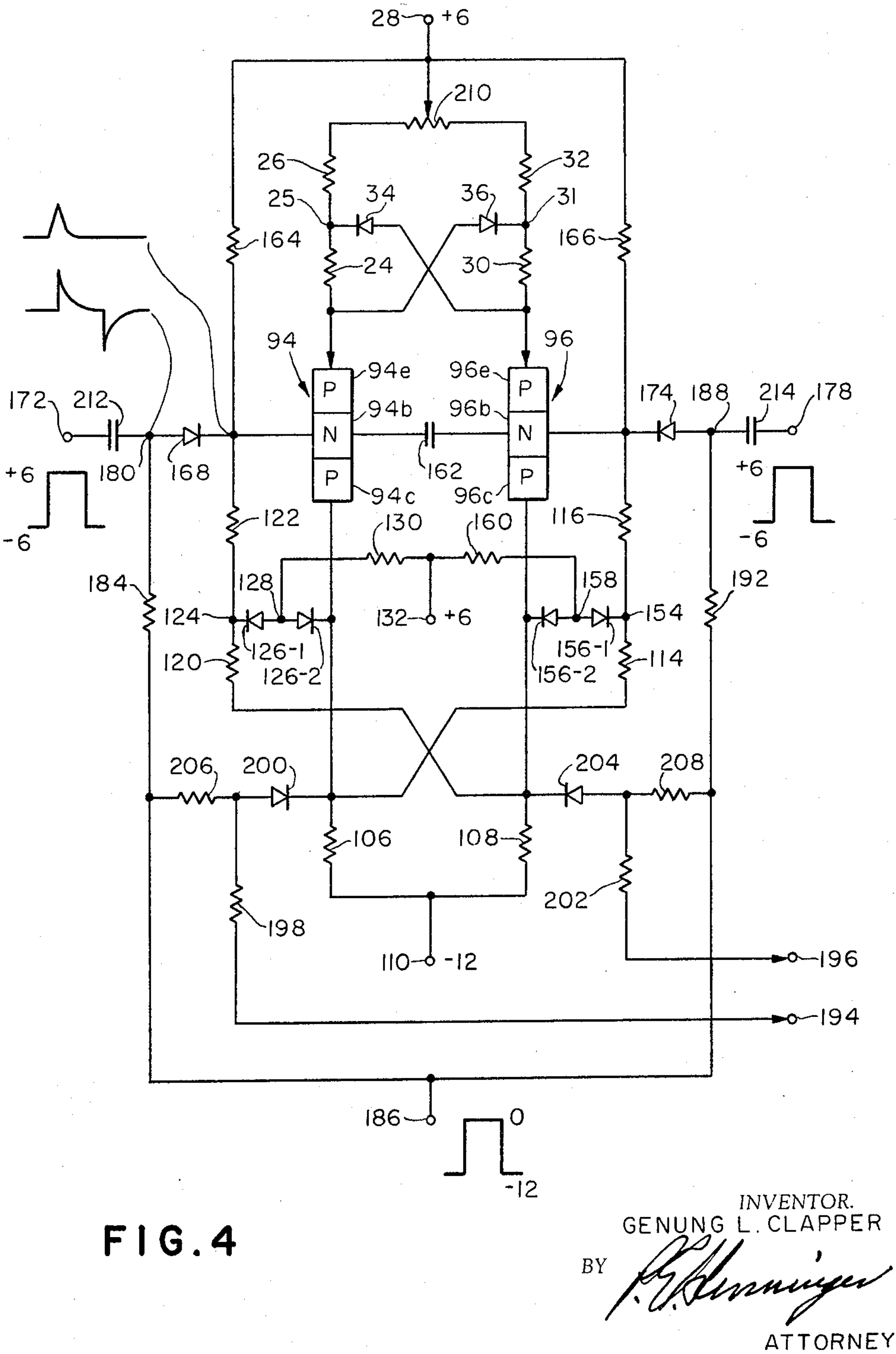

FIG. 2*a* is a stability diagram graphically illustrating the different stable states of the circuit of FIG. 2;

FIG. 3 is a detailed diagram of a multistable circuit in accordance with the invention employing both selective decoupling of regeneratively coupled translating devices and degenerative feedback; and FIG. 4 is a detailed diagram of a modified form of the circuit of FIG. 3.

THE CIRCUIT OF FIG. 1

Figure 1:
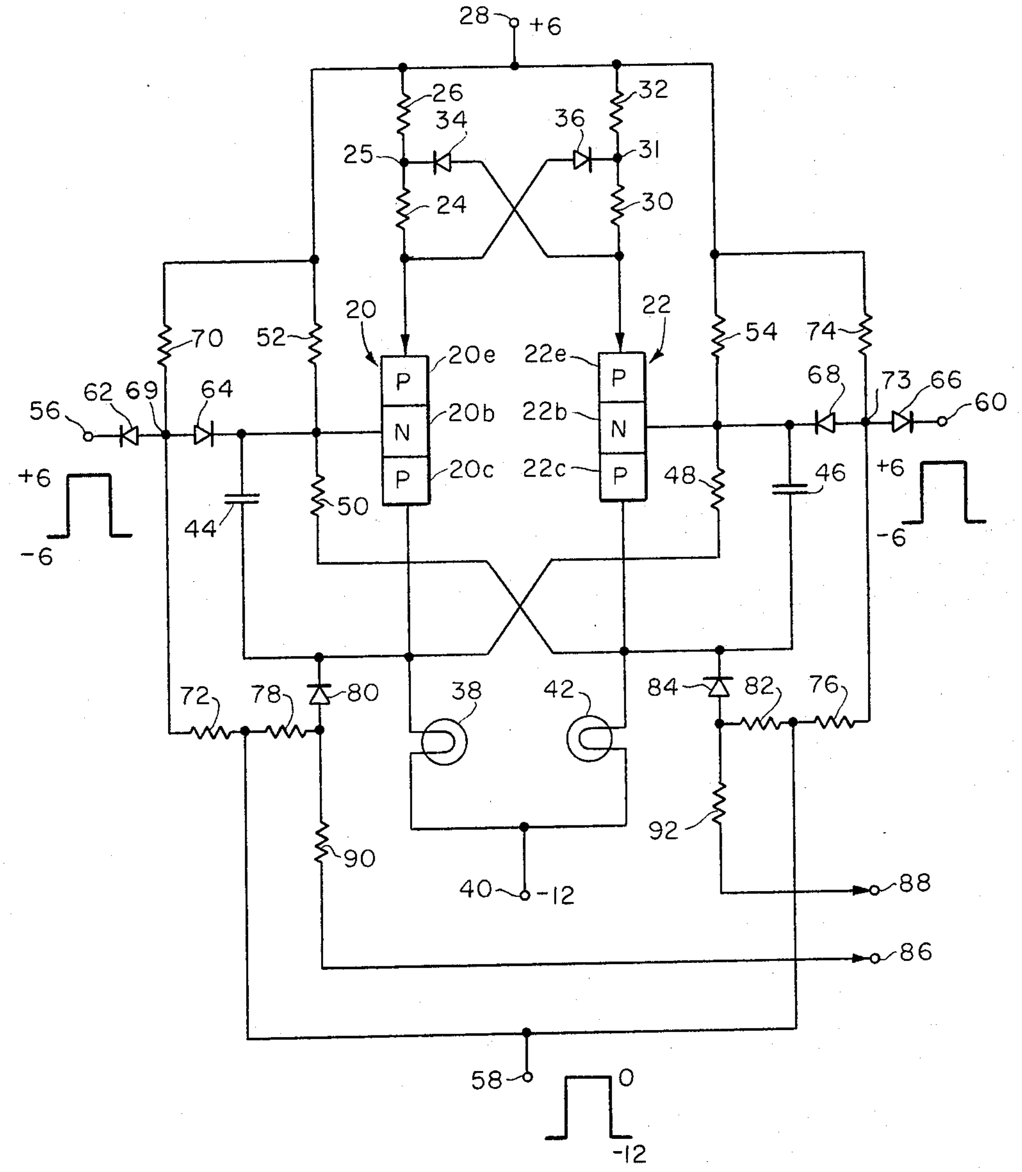
FIG. 1 is a detailed diagram of a multistable circuit in accordance with the invention employing selective decoupling of regeneratively coupled translating devices.

The circuit of FIG. 1 is a multistable circuit employing selective decoupling of regeneratively coupled translating devices to provide a total of three stable states of operation. Referring to FIG. 1, two translating devices 20 and 22 are employed, typically comprising transistors having emitters **20*e* and 22*e*, bases 20*b* and 22*b*, and collectors 20*c* and 22*c*. Emitter 20*e* is coupled through emitter resistors 24 and 26 to a terminal 28 supplied with a potential of +6 volts, for example. Emitter 22*e* is coupled through associated resistors 30 and 32 to the terminal 28. Junction 25 of the resistors 24 and 26 is coupled by a diode 34 to the emitter 22*e*. Similarly, a diode 36 couples junction 31 of the resistors 30 and 32 to the emitter 20*e***.

Collector **20*c* is coupled through an associated incandescent light 38, which serves as a collector load resistance, to a terminal 40 supplied with a potential of −12 volts, for example. Collector 22*c* is similarly connected to the terminal 40 through an associated incandescent light 42. Collector 20*c* is connected by an associated capacitor 44 to base 20*b*, while collector 22*c* is similarly coupled by capacitor 46 to base 22*b*. Additionally, collector 20*c* is coupled by resistor 48 to base 22*b*, while collector 22*c* is coupled to base 20*b* by resistor 50. Base 20*b* is also connected to the terminal 28 through an associated resistor 52, while base 22*b* is similarly coupled to the terminal through a resistor 54**.

Terminals 56, 58 and 60 serve as input terminals to the circuit. The signal at the terminals 56 and 60 each assume one of two values, typically —6 or +6 volts, while the signal at the terminal 58 is either −12 or 0 volts, for example. The terminals 56 and 60 are respectively coupled through diodes 62, 64 and 66, 68 to bases **20*b* and 22*b*, respectively. Junction 69 of the diodes 62 and 64 is connected to the terminal 28 through a resistor 70 and to the terminal 58 through a resistor 72. Similarly, junction 73 of the diodes 66 and 68 is connected to the terminal 28 through a resistor 74 and to the terminal 58 through a resistor 76. The terminal 58 is also coupled to the collector 20*c* through a resistor 78 and diode 80 and to the collector 22*c* through a resistor 82 and diode 84. Output signals appear at terminals 86 and 88 which are coupled through resistors 90 and 92, respectively, to diodes 80 and 84**, respectively.

To explain the operation of the circuit of FIG. 1, it is assumed that the transistor 20 is fully conductive while the transistor 22 is completely nonconductive. It is further assumed that the signals applied to the terminals 56, 60 and 58 are −6 volts, −6 volts and −12 volts, respectively. The diodes 62 and 66 prevent the potentials at the points 69 and 73 from rising above the potentials of the terminals 56 and 60, respectively.

Assume now that the potentials at the terminals 56 and 58 change abruptly to +6 and 0 volts, respectively, while the potential at the terminal 60 remains at −6 volts. The potential of the junction 69 increases positively which renders the diode 64 forwardly biased and conductive, allowing a positive charge to accumulate on the capacitor 44. The base **20*b* becomes more positive and accordingly the forward bias between the base and the emitter 20*e* diminishes. This renders the transistor 20 less conductive, which causes the potential of the collector 20*c* to become more negative. The drop in potential of the collector 20*c* is coupled to the base 22*b* of the transistor 22 through the resistor 48, which increases the forward bias between the emitter 22*e* and the base 22*b*, causing the transistor 22** to become more conductive.

During heavy conduction in the transistor 20 and little or no conduction in the transistor 22, the potential of the emitter **20*e* is negative while that of the emitter 22*e* is positive. Accordingly, the diode 36 is back-biased or nonconductive, while the diode 34 is conductive, coupling the emitter 22*e* to the junction 25 of the collector resistors 24 and 26. When the transistor 20 commences to become less conductive, the potential of the junction 25 is made more positive. This positive increase is communicated through the conductive diode 34 to the emitter 22*e*, which further increases the forward bias between the emitter and the base 22*b*** and reinforces the increase in conduction in that transistor.

Thus far, the operation of a typical bistable circuit has been set forth. The coupling provided between the transistors 20 and 22 by the conductive diode 34 effectively reduces the emitter resistance of the transistor 22, inasmuch as the emitter resistors 30 and 32 are shunted by the resistor 26. The resistance values are such as to render the effective emitter resistance less than that of the collector resistance provided by the incandescent lamp 42. The emitter resistance of transistor 20 is also reduced inasmuch as resistor 26 is shunted by the resistors 30 and 32. There is now a common emitter impedance formed by the parallel resistors, and the effective gain of each transistor stage as well as the loop gain of the entire circuit is greater than unity. The circuit is therefore unstable, and the action described above continues with the transistor 20 being driven less conductive and the transistor 22 being driven more conductive.

This action continues for as long as the diode 34 remains conductive, which is until the transistors 20 and 22 approach substantially equal conduction. At this time, the diode 34 becomes back-biased or nonconductive, decoupling the emitter **22*e* from the junction 25. The diode 36 is still back-biased and nonconductive, and thus the emitters of the transistors 20 and 22 are decoupled from each other. If, at this time, the input signal at the terminal 56 changes from +6 to −6 volts and/or the input signal at the terminal 58 changes from 0 to −12 volts, the circuit of FIG. 1 remains stable with the transistors 20 and 22 conducting substantially equally. This is because the lowering of either or both of the potentials applied to the input terminals 56 and 58 reduces the potential at the junction 69. This back-biases the diode 64 and terminates the application of positive charge to the capacitor 44, which prevents any further reduction of the forward bias between the emitter 20*e* and base 20*b*. The regenerative coupling between the transistors provided by the conductive diode 34 is removed, thereby eliminating the shunting of the emitter resistors 30 and 32 by the resistor 26, increasing the emitter resistances of transistor 22 and transistor 20**. The effective gain of each transistor stage, as well as the loop gain of the entire circuit, is less than unity under these conditions. The circuit is thus rendered stable.

If either or both of the input signals applied to the terminals 56 and 58 is changed to its relatively negative value prior to the time at which the diode 34 is rendered back-biased and nonconductive, the decreasing conduction of the transistor 20 and the increasing conduction of the transistor 22 is terminated, and the changes in conduction are reversed. This is because the loop gain remains greater than unity, rendering the circuit unstable. The charge on the capacitor 44 is dissipated through the resistor 50, thereby reducing the potential of the base **20*b* and increasing the forward bias between the emitter 20*e* and the base 20*b*, causing the transistor 20 to increase in conduction. The increase in conduction is accompanied by a positive increase in the potential of the collector 20*c* which is coupled to the base 22*b* through the resistor 48, thereby decreasing the forward bias between the emitter 22*e* and the base 22*b*, decreasing the conduction in the transistor 22. Concurrently, the potential of the junction 25 is lowered, which is coupled through the conductive diode 34 to the emitter 22*e*, further reducing the forward bias between the emitter and the base of the transistor 22** and reducing the conduction of the transistor.

If the potentials at the terminals 56 and 58 are not raised to their relatively positive values of +6 and 0 volts, respectively, this action continues with the transistor 20 being driven again to full conduction and the transistor 22 being driven fully to its nonconductive state as the charge on the capacitor 44 is dissipated. This is a stable state of the circuit.

If, on the other hand, the signals at the terminals 56 and 58 are again rendered relatively positive before the charge on the capacitor 44 has dissipated entirely, the junction 69 increases in potential positively, rendering the diode 64 again forward-biased and conductive, and again charging the capacitor 44. It will be noted, therefore, that the capacitor 44 provides a memory for the system so that successive input signals may be stored thereon, each of which may be insufficient to change the state of the circuit from one stable state to another, but which collectively may be sufficient to make such a change if the signals occur sufficiently close in time with respect to each other. The time constant of the capacitor 44 and resistor 50 effectively determines the memory characteristics of this portion of the circuit.

If, when the transistors 20 and 22 are conducting substantially equally and the diodes 34 and 36 are both back-biased and nonconductive, the signals at the terminals 56 and 58 are at +6 and 0 volts, respectively, the potential of the junction 69 continues to increase positively, thereby continuing to apply positive charge to the capacitor 44 through the forward-biased diode 64. This further reduces the forward bias between the emitter **20*e* and the base 20*b*, which renders the transistor 20 still less conductive, raising the potential of the emitter 20*e* and lowering the potential of the collector 20*c*. The diode 34 remains back-biased and nonconductive; however, at this time the diode 36 is rendered forward-biased and conductive, coupling the emitter 20*e* to the junction 31. The emitter resistors 24 and 26 are now shunted by the resistor 32, creating a common emitter impedance which renders the gain of the stages formed by transistor 20 and transistor 22, as well as the loop gain of the circuit, greater than unity. The transistors 20 and 22 are thus regeneratively coupled so that the transistor 20 increases in conduction regardless of the input signals applied to the terminals 56 and 58. The conductive diode 36 coupling together the emitter 20*e* and the junction 31 produces the same type of regenerative action as does the diode 34, when conductive as described above, coupling together the emitter 22e and the junction 25. The regenerative action continues until the transistor 22 is fully conductive and the transistor 20** is fully nonconductive.

When the transistor 22 is fully conductive and the transistor 20 is fully nonconductive, the circuit may be switched to the stable intermediate state in which both transistors conduct substantially equally or to the other stable state in which the conduction of the transistors is reversed by the application of relatively positive input signals to the terminals 58 and 60. The action is similar to that just described with respect to the application of relatively positive signals to the terminals 56 and 58. Thus the states may be changed from either input 56 or 60 and the input 58 and in either direction.

Output signals representative of the states of conduction of the transistors 20 and 22 appear at output terminals 86 and 88, respectively. When the signal applied to the terminal 58 is at −12 volts, the diodes 80 and 84 are back-biased, inasmuch as the potentials of the collectors 20c and 22c can never become more negative than −12 volts. Accordingly, the potentials of the terminals 86 and 88 are fixed at a negative potential of roughly −12 volts.

When the signal at the terminal 58 is raised to 0 volts, the diodes 80 and 84 are forwardly biased and are rendered conductive, coupling the collectors 20c and 22c to the terminals 86 and 88 through the resistors 90 and 92. Each of the signals at the output terminals varies from a relatively negative potential (corresponding to no conduction in the associated transistor) through an intermediate potential (corresponding to the intermediate stable state of substantially equal conduction in the transistors) to a relatively positive potential (corresponding to complete conduction in the associated transistor). The potential at each output terminal is representative of the exact state of conduction of the associated transistor, and thus provides information indicating whether the transistor is at a stable state or is between stable states.

The states of conduction of the transistors 20 and 22 are also indicated visually by the lights 38 and 42, which vary in light emitted depending upon the state of conduction. These lights may be replaced by fixed resistances, if desired.

It will be noted that the circuit of FIG. 1 requires that input signals be concurrently applied to the terminal 58 and to one of the terminals 56 and 60 to change the state of the circuit. This is useful in systems wherein a concurrence of input signals is required to cause a change to take place. Single input signals, however, may be used to trigger the circuit of FIG. 1 if desired. In this case the terminal 58 is continuously supplied with a potential of 0 volts. Input signals are then applied only to the terminals 56 and 60.

THE CIRCUIT OF FIG. 2

The circuit of FIG. 2 is a multistable circuit employing selective degenerative feedback in each of regeneratively coupled translating devices. Referring to FIG. 2, a circuit is shown having a total of six stable operating states, the number six being arbitrary and merely representative. The circuit includes two translating devices 94 and 96 which may comprise transistors having emitters 94e and 96e, bases 94b and 96b and collectors 94c and 96c. Emitter 94e is coupled through resistors 98 and 100 to a terminal 102 which is supplied with a potential of +6 volts, for example. Emitter 96e is coupled by a resistor 104 and the resistor 100 to the terminal 102. Collectors 94c and 96c are coupled through resistors 106 and 108, respectively, to a terminal 110 which is supplied with a potential of −12 volts, for example. Collector 94c is coupled to base 96b through resistors 112, 114 and 116, while collector 96c is coupled to base 94b through retistors 118, 120 and 122.

Junction 124 of resistors 120 and 122 is coupled to collector 94c through diodes 126–1 and 126–2. Junction 128 of these diodes is coupled through a resistor 130 to a terminal 132 which is supplied with a potential of +6 volts, for example. Similarly, junction 134 of resistors 118 and 120 is coupled to collector 94c through diodes 136–1 and 136–2. Junction 138 of these diodes is coupled through resistor 140 to the terminal 132.

Junction 144 of resistors 112 and 114 is coupled to collector 96c through diodes 146–1 and 146–2. Junction 148 of the diodes is coupled through resistor 150 to the terminal 132. Junction 154 of resistors 114 and 116 is coupled to collector 96c through diodes 156–1 and 156–2. Junction 158 of these diodes is coupled through resistor 160 to terminal 132.

Bases 94b and 96b are connected together by a capacitor 162. Base 94b is coupled by a resistor 164 to the terminal 102 while base 96b is coupled to the terminal through a resistor 166. Base 94b is also connected through diodes 168 and 170 to an input terminal 172, while base 96b is coupled through diodes 174 and 176 to an input terminal 178. Junction 180 of the diodes 168 and 170 is connected through a resistor 182 to the terminal 102 and through a resistor 184 to an input terminal 186. Junction 188 of the diodes 174 and 176 is connected through a resistor 190 to the terminal 102 and through a resistor 192 to the input terminal 186.

The terminals 172, 178 and 186 comprise the input terminals to the circuit and are adapted to receive input signals which are normally at potentials of −6 volts, −6 volts and −12 volts, for example. Output signals from the circuit appear at terminals 194 and 196 which are coupled respectively to collectors 94c and 96c through resistor 198, diode 200 and resistor 202, diode 204, respectively. The diodes 200 and 204 are also respectively coupled through resistors 206 and 208 to the input terminal 186.

To explain the operation of the circuit of FIG. 2, it is assumed that the transistor 94 is fully conductive while the transistor 96 is completely nonconductive. It is further assumed that the signals applied to the terminals 172, 178 and 186 are −6 volts, −6 volts and −12 volts, respectively. The diodes 170 and 176 prevent the potentials at the points 180 and 188, respectively, from rising above −6 volts, which is the normal potential for these points. Assume now that the signals applied to the terminals 172 and 186 change abruptly to +6 and 0 volts, respectively, while the terminal 178 remains at −6 volts. In this event, the diode 170 becomes back-biased and nonconductive, and the potential of the point 180 commences to increase positively. This biases the diode 168 forwardly, and thus the base 94b also commences to increase positively in potential. By virtue of the condenser 162 between the bases 94b and 96b, the potential of the base 94b rises at a predetermined rate determined by the time constant of the capacitor 162 and associated resistances. In this regard, the capacitor 162 is made large with respect to the junction capacitances of the transistors 94 and 96 to render the operation of the circuit uniform when a plurality of circuits each as shown in FIG. 2 are employed in a data processing system.

As the base 94b increases positively in potential, the forward bias between the emitter 94e and the base decreases, thereby decreasing the conduction of the transistor 94. This decrease in conduction raises the potential of the emitter 94e, which is coupled to the emitter 96e through the resistors 98 and 104, thereby raising the potential of that emitter and increasing the forward bias between the emitter 96e and 96b. Additionally, the forward bias between the emitter 96e and 96b is increased due to the falling potential of the collector 94c which is coupled to the base 96b through the resistors 112, 114 and 116.

The operation of the transistors 94 and 96 is like any bistable circuit in which the emitters have a common resistance (resistor 100) to provide cross-coupling, and wherein the base of each transistor is cross-coupled to the collector of the other transistor, all to provide a loop gain of greater than unity. Normally, with the regenerative coupling thus provided, the application of an input pulse would result in the transistors 94 and 96 changing states. However, as the collector 94c becomes more negative in potential while base 94b becomes more positive, there is a time at which the potential at the junction point 124 is equal to the potential of the collector 94c. At this time the diodes 126–1 and 126–2, one of which previously was conductive and one of which previously was nonconductive, are both rendered conductive, thereby directly coupling the collector 94c and the base 94b together through the resistor 122. This coupling provides degenerative feedback between the collector and the base of the transistor 94, inasmuch as any change in conduction of the transistor is opposed.

Specifically, if the transistor commences to decrease in conduction, the falling potential of the collector 94c produces a corresponding falling potential in the base 94b, which increases the forward bias between the emitter and the base, tending to increase the conduction in the transistor. On the other hand, if the conduction in the transistor tends to increase, the potential of the collector 94c rises as does the potential of the base 94b coupled thereto through the resistor 122. This decreases the forward bias between the emitter and the base of the transistor which tends to decrease the current flowing in the transistor.

Accordingly, if at the time the diodes 126–1 and 126–2 are rendered conductive providing degenerative feedback in the transistor 194, either or both of the input signals applied to the terminals 172 and 186 is rendered relatively negative, thereby discontinuing the application of a positive charge to the base 94b, the transistor 94 is stabilized at this intermediate state of conduction. The degenerative feedback in the transistor 94 therefore overrides the regenerative coupling between the transistors 94 and 96, reduces the loop gain to less than unity, and fixes the conduction in the transistors at the values existing when degenerative feedback was provided. In this regard, the coupling provided by the capacitor 162 between the bases 94b and 96b opposes the regenerative action, thus stabilizing the circuit action by preventing overshoot beyond the stable state provided by degenerative feedback.

If the input signals at the terminals 172 and 186 persist at the relatively positive values of +6 and 0 volts, respectively, the base 94b continues to rise in potential, not withstanding the degenerative feedback provided by the diodes 126–1 and 126–2. Accordingly, the conduction of the transistor 94 continues to decrease, and, through the regenerative coupling described above between the transistors, the transistor 96 continues to increase in conduction. One of the diodes 126–1 and 126–2 is rendered back-biased or nonconductive, specifically, the diode 126–1. This removes the degenerative feedback provided by the diode pair and changes the loop gain of the circuit to greater than unity.

The potential of the collector 94c continues to fall until it is equal to the potential at the junction point 134. At this time the diodes 136–1 and 136–2, only one of which was previously conductive, are both rendered conductive, thereby coupling the collector 94c to the base 94b through the resistors 120 and 122. Again degenerative feedback is provided between the collector and the base of the transistor which stabilizes the conduction in the transistor and fixes the conduction of the transistors 94 and 96 as long as the input signals applied to the terminals 172 and 186 are not both relatively positive.

If the input signals to the terminals 172 and 186 continue to be relatively positive, the degenerative feedback provided by the diodes 136–1 and 136–2 is overridden and the transistor 94 continues to decrease in conduction while the transistor 96 continues to increase in conduction. The diode 136–1 becomes back-biased and nonconductive, removing the degenerative feedback.

The increase in conduction of the transistor 96 produces a corresponding rise in potential of the collector 96c. As the potential rises, it passes a potential which is equal to that of the junction 144 between the resistors 112 and 114. At this time the diodes 146–1 and 146–2, one of which was previously nonconductive, are both rendered conductive, thereby coupling the base 96c to the base 96b of the transistor 96 through the resistors 114 and 116. This provides degenerative feedback in the transistor 96, the same as the degenerative feedback described above with respect to the transistor 94. Accordingly, further change is resisted, and if the input signals applied to the terminals 172 and 186 are no longer both relatively positive, the regenerative coupling between transistors is overridden and the conduction in both the transistors 94 and 96 is stabilized.

If, however, the input signals applied to the terminals 172 and 186 continue to be relatively positive, the degenerative feedback in the transistor 96 is overridden and the transistor 94 continues to decrease in conduction while the transistor 96 continues to increase in conduction. The diode 146–2 becomes back-biased and nonconductive, removing the degenerative feedback.

The potential of the collector 96c therefore continues to increase until it is equal to the potential of the junction 154 between the resistors 114 and 116. At this time the diodes 156–1 and 156–2 are both rendered conductive, providing degenerative feedback between the collector 96c and the base 96b through the resistor 116. If at this time the input signals applied to the terminals 172 and 186 are no longer both relatively positive, the conduction in the transistors 94 and 96 is stabilized and no further conduction changes occur.

If, however, the signals applied to the terminals 172 and 186 continue to remain relatively positive, the transistors 94 and 96 respectively decrease and increase in conduction, overriding the degenerative feedback and removing it when the diode 156–2 becomes back-biased, until the transistor 96 is fully conductive and the transistor 94 is completely nonconductive.

The circuit operates in similar fashion to decrease the conduction in the transistor 96 and to increase the conduction in the transistor 94 in response to relatively positive signals applied to the terminals 178 and 186.

It will be noted that the diode pairs 126–1 and 126–2, 136–1 and 136–2, 146–1 and 146–2, and 156–1 and 156–2 provide four additional stable states of operation to the circuit of FIG. 2 besides the two stable "end states" provided by the regenerative coupling between the transistors. The following table provides a tabulation of representative potentials of the collectors 94c and 96c corresponding to the six stable states of operation of the circuit.

*Table 1*

| State | Potential of Collector 94c | Potential of Collector 96c |
|---|---|---|
| 1 | −2 | −9 |
| 2 | −4 | −7 |
| 3 | −4.5 | −5 |
| 4 | −5 | −4.5 |
| 5 | −7 | −4 |
| 6 | −9 | −2 |

FIG. 2*a* is a stability diagram for the circuit of FIG. 2 in terms of the data tabulated in Table 1. The table states of the circuit are indicated by the intersections of the solid curve with the horizontal axis, which is calibrated in terms of the difference between the potentials of the collectors 94c and 96c. The peaks of the curve represent the transition points between stable states, on either side of which the circuit assumes the stable state closest thereto.

It will be noted that the circuit of FIG. 2 has been described as "symmetrical," i.e., the stable states are symmetrically located with respect to the vertical axis in FIG. 2*a*. This is not a necessary feature of the circuit. By suitable selection of the resistors 118, 120, 122; 112, 114, 116; and 130, 140, 150, 160, the stable states may be made nonsymmetrical if desired. Further, any number of stable states in addition to the two stable end states may be achieved depending upon the number of diode pairs (e.g., 126–1 and 126–2) employed.

The circuit is reset by the monemtary application of a relatively positive signal to the terminal 110. This raises the potentials of the collectors **94*c* and 96*c* and establishes the circuit in either stable state 3 or stable state 4, the actual state to which the circuit advances being dependent upon random factors. No attempt is made to direct the reset state to a particular one of stable states 3 and 4**.

The potentials of the collectors **94*c* and 96*c*, which are representative of the states of the transistors 94 and 96, are coupled to the output terminals 194 and 196, respectively, through the diodes 200 and 204, respectively. In this regard, when the potential at the input terminal 186 is rendered relatively positive, the diodes 200 and 204 are forwardly biased and the potentials of the collectors 94*c* and 96*c* are coupled through the diodes to the output terminals. When the potential at the terminal 186 is at −12 volts, the diodes 200 and 204 are backbiased, fixing the potentials at the output terminals 194 and 196** at roughly −12 volts.

It will be noted that the time constant of the capacitor 162 and related resistors slows the circuit in its changing from one state to another. If the time constant is long enough and the input pulses short enough, a memory action may be provided. Thus, if a single input signal is not sufficient to change the circuit from one state to another, the capacitor provides storage of charges and accumulates one or more input signals, which, if occurring closely enough in time with respect to each other, are sufficient to change the circuit from one state to another.

THE CIRCUIT OF FIG. 3

The circuit of FIG. 3 is a multistable circuit which combines the features of the circuits of FIGS. 1 and 2, typically to provide an odd number of stable states. The circuit shown provides a total of five stable states, although this is merely representative.

Referring to FIG. 3, the elements in the circuit are designated by the same numerals used in FIGS. 1 and 2; like-numbered components perform the same function.

Thus the diodes 34 and 36 provide a cross-coupling between the emitter cicuits of transistors 94 and 96 to produce the two stable end states of operation, with selective decoupling to result in an additional stable state. A poteniometer 210 couples the emitter circuits to the terminal 28, which is supplied with a potential of +6 volts for example.

Only diode pairs 126–1, 126–2 and 156–1, 156–2 are included to provide degenerative feedback in the transistors 94 and 96, respectively, leading to two additional stable states.

To explain the operation of the circuit of FIG. 3, assume that the transistor 94 is conducting heavily and the transistor 96 is completely nonconductive. At this time the signals at the input terminals 172, 178 and 186 are −6 volts, −6 volts and −12 volts, respectively. Assume further that the signals applied to the terminals 172 and 186 are abruptly raised to +6 volts and 0 volts, respectively, while the potential at the terminal 178 remains at −6 volts.

As described above with respect to the circuits of FIGS. 1 and 2, this action causes the transistor 94 to decrease in conduction while the transistor 96 commences to conduct. Through the cross-coupling of the emitter circuits by the conductive diode 34, and through the cross-coupling of the base of each transistor with the collector of the other transistor, the changes in conduction are reinforced and the transistor 94 continues to decrease in conduction while the transistor 96 increases in conduction. This continues until the potential of the collector **94*c* is the same as that of the junction 124 of the resistors 120 and 122. At this time, the doides 126–1 and 126–2 are both conductive, providing degenerative feedback between the collector 94*c* and the base 94*b* of the transistor 94. If either or both of the input signals applied to the input terminals 172 and 186** is of a relatively negative value, the continues to decrease in conduction, while the transistor as described above in connection with the circuit of FIG. 2, and no further changes in conduction will take place.

On the other hand, if the signals applied to the terminals 172 and 186 remain relatively positive, the degenerative feedback is overridden and the transistor 94 continues to decrease in conduction, while the transistor 96 increases in conduction. The diodes 126–1 and 126–2 are no longer both conductive, thereby removing the degenerative feedback in the transistor 94, and the changes in conduction of both transistors continue until the diode 34 becomes nonconductive along with the nonconductive diode 36. At this time the cross-coupling between the emitters of the transistors is removed. If one or both of the input signals applied to the terminals 172 and 186 has assumed a relatively negative value, the conduction of the transistors 94 and 96 is stabilized as described above with respect to the circuit of FIG. 1, and no further changes in conduction occur.

However, if the signals at the input terminals 172 and 186 remain relatively positive, the transistors 94 and 96 continue to decrease and increase in conduction, respectively. These conduction changes continue until the potential of the collector **96*c* is the same as the potential of the junction 154 between the resistors 114 and 116. At this time the diodes 156–1 and 156–2 are both rendered conductive, which provides degenerative feedback in the transistor 96 and prevents further changes in conduction in both the transistors if one or both of the input signals at the terminals 172 and 186 has become relatively negative. If the input signals at the terminals 172 and 186 remain relatively positive, however, the degenerative feedback is overridden and the the transistor 96 continues to increase in conduction, while the transistor 94 decreases in conduction. The diodes 156–1 and 156–2 are no longer both conductive, thereby removing the degenerative feedback, and the circuit advances to its end state wherein the transistor 96 is fully conductive and the transistor 94** is completely nonconductive.

Output signals representative of the states of conduction of the transistors 94 and 96 are developed at the output terminals 194 and 196, as described above in connection with the circuit of FIG. 2.

The following table provides a tabulation of representative potentials of the collectors **94*c* and 96*c*** corresponding to the five stable states of operation of the circuit.

| State | Potential of Collector 94c | Potential of Collector 96c |
|---|---|---|
| 1 | −9.5 | −1.0 |
| 2 | −6.5 | −2.8 |
| 3 | −4.2 | −4.2 |
| 4 | −2.8 | −6.5 |
| 5 | −1.0 | −9.5 |

As pointed out above in connection with the circuit of FIG. 2, any number of diode pairs (e.g., diodes 126–1 and 126–2) may be employed. In general, in the circuit of FIG. 3, for each diode pair associated with one of the transistors there is a corresponding diode pair associated with the other transistor. Thus the diode pairs are typically divided evenly between the transistors to provide an even number of stable states. The regenerative coupling and selective decoupling provided by the diodes 34 and 36 provide a total of three stable states. Hence the emitter diodes 34 and 36, together with the collector diode pairs, generally provide any number of odd stable states. However, as pointed out in connection with the circuit of FIG. 2, any number of collector diode pairs may be employed to provide any number (even or odd) of stable states to suit the requirements of a particular system.

THE CIRCUIT OF FIG. 4

The circuit of FIG. 4 is the same as the circuit of FIG. 3, with a few changes to ensure that, in response to a single input signal, the circuit changes from a stable state to the next stable state without passing through this next stable state. The components are designated by the same numerals used in the circuit of FIG. 3, and by comparing FIGS. 3 and 4 it will be noted that the resistors 182 and 190 have been removed, and the diodes 170 and 176 have been replaced by capacitors 212 and 214, respectively.

In operation, the capacitors 212 and 214, together with resistors 184 and 192, respectively, generate pulses of limited duration regardless of the length of duration of an input signal. The capacitors and associated resistors constitute differentiating circuits to generate positive and negative pulses at each of the junctions 180 and 188. See, for example, the waveform in FIG. 4 associated with the junction 180. The diodes 168 and 174 are forwardly biased only when positive pulses appear at the junctions 180 and 188, respectively, and thus only apply positive pulse signals to the transistor bases **94*b* and 96*b*, respectivtly. See, for example, the waveform associated with transistor base 94*b***. The time constant of each capacitor-resistor combination is chosen so that the positive pulse applied to the base of the associated transistor is effective only to switch the transistors from one stable of conduction to the next stable state.

Because of the time constants of the capacitor-resistor combinations, the relatively positive signal applied to the terminal 186 also necessary for changing the state of the circuit should be applied prior to the pulse at the terminal 172 or 178 to ensure that the charging of the capacitors 212 and 214 by the pulse applied to the terminal 186 is completed.

SUMMARY

The invtntion described above provides additional stable states of operation in a bistable circuit by employing selective decoupling of the regenerative coupling between the two translating devices of the circuit and/or selective degenerative feedback in each of the translating devices.

While the invention has been particularly shown and described with reference to preferred embodiments thereof, it will be understood by those skilled in the art that various changes in form and details may be made therein without departing from the spirit and scope of the invention. Accordingly, the invention should be taken as defined by the following claims.

What is claimed is:

1. In a circuit which has two electrical devices coupled together regeneratively so that when one of the devices is in a first state the other device is in a different state, the combination of means for selectively decoupling the devices from each other when the devices are in predetermined states to render the devices stable in these states, and means for selectively providing degenerative feedback in only one of the devices at any time to counteract the regenerative coupling and to permit the devices to be stabilized at pre-established states.

2. In a circuit which has two electrical devices, the combination of means for coupling the devices together regeneratively so that when one of the devices is in a first state the other device is in a different state, and means for selectively providing degenerative feedback in only one of the devices at any time to counteract the regenerative coupling and to premit the devices to be stabilized at preestablished states.

3. In a circuit which has two electrical devices coupled together so that the loop gain of the circuit exceeds unity and tends to hold one of the devices in a state of conduction and the other device in a state of nonconduction, the combination of means for selectively modifying the coupling between the devices to reduce the loop gain of the circiut to less than unity at predetermined states of conduction of the devices to render the devices stable at such states, and means for selectively providing degenerative feedback in only one of the devices any time to reduce the loop gain of the circuit to less than unity at preestablished states of conduction of the devices to render the devices stable at such states.

4. In a circuit including two electrical devices, the combination of means coupling together the devices so that the loop gain of the circuit exceeds unity and tends to hold one of the devices in a state of conduction and the other device in a state of nonconduction, and means for selectively providing degenerative feedback in only one of the devices at any time to reduce the loop gain of the circuit to less than unity at pre-established states of conduction of the devices to render the devices stable at such states.

5. In a circuit which has two electrical translating devices each having first and second terminals and a control terminal, each device being rendered conductive between its first and second terminals by the application of a suitable potential to its control terminal, the combination of first means coupling together the first terminals of the devices to render the devices regeneratively coupled so that when one of the devices is conductive the other device is nonconductive, and second means for selectively coupling together the second and control terminals of only one of the devices at any time to provide degenerative feedback in the device that stabilizes the conduction in the devices at the states when degenerative feedback was provided.

6. A circuit as recited in claim 5, wherein the second means stabilizes the conduction in each of the translating devices in a plurality of pre-established states, and including means for generating pulse signals for application to the control terminals of the translating devices to change the states of conduction of the devices, each pulse signal being sufficient to change the states of conduction of the translating devices from one pre-established state to the next pre-established state without passing through said next pre-established state.

7. A circuit as recited in claim 5, wherein the second means comprises diode means coupling together the second and control terminals of only one of the translating devices at a selected potential.

8. A circuit as recited in claim 5, wherein the second means comprises an even number of diode networks, one half of the diode networks being associated with one of the translating devices and the other half of the diode networks being associated with the other translating device, each diode network coupling together the second and control terminals of the associated device at a different potential.

9. A circuit as recited in claim 5, wherein the first means includes means for selectively decoupling the first terminals of the translating devices from each other to remove the regenerative coupling between the devices and to stabilize the conduction in the devices at predetermined states.

10. A circuit as recited in claim 9, wherein the means for selectively decoupling the first terminals of the translating devices comprises diode means responsive to the potentials of the first terminals for decoupling the first terminals at predetermined potentials.

11. A circuit as recited in claim 5, including input means coupled to the control terminals which has applied thereto input signals, the translating devices being made to change states by the application to the input means of an input signal for a predetermined period of time, and storage means coupled to the input means for storing for a given time each input signal applied to the input means to provide a memory for the circuit so that consecutive input signals, if spaced closely enough in time, collectively are sufficient to change the states of conduction of the translating devices while the individual successive signals are incapable of changing the states.

12. A circuit as recited in claim 5, wherein the translating devices comprise PNP-type transistors each having an emitter, collector and base, wherein the emitters constitute the first terminals, the collectors constitute the second terminals, and the bases constitute the control terminals.

References Cited by the Examiner

UNITED STATES PATENTS

| | | | |
|---|---|---|---|
| 2,636,985 | 4/1953 | Weissman | 328—205 |
| 3,046,413 | 7/1962 | Clapper | 307—88.5 |

FOREIGN PATENTS

| | | |
|---|---|---|
| 148,967 | 1/1963 | U.S.S.R. |

References Cited by the Applicant

UNITED STATES PATENTS

| | | |
|---|---|---|
| 2,651,717 | 9/1953 | Uttley et al. |
| 2,810,072 | 10/1957 | Amatniek. |

ARTHUR GAUSS, *Primary Examiner.*

S. D. MILLER, *Assistant Examiner.*

UNITED STATES PATENT OFFICE

CERTIFICATE OF CORRECTION

Patent No. 3,286,103 November 15, 1966

Genung L. Clapper

It is hereby certified that error appears in the above numbered patent requiring correction and that the said Letters Patent should read as corrected below.

Column 8, line 70, for "table" read -- stable --; column 10, line 15, for "continues to decrease in conduction, while the transistor" read -- conduction in the transistors 94 and 96 will be stabilized, --.

Signed and sealed this 12th day of September 1967.

(SEAL)
Attest:

ERNEST W. SWIDER
Attesting Officer

EDWARD J. BRENNER
Commissioner of Patents